United States Patent [19]
Kobasic

[11] Patent Number: 5,577,793
[45] Date of Patent: Nov. 26, 1996

[54] MULTIPURPOSE HIGHWAY VEHICLE

[76] Inventor: Richard A. Kobasic, 103 First Avenue South, Escanaba, Mich. 49829

[21] Appl. No.: 51,074

[22] Filed: Apr. 21, 1993

[51] Int. Cl.$^6$ ............................... B60J 5/06; B62D 21/02
[52] U.S. Cl. .................... 296/146.4; 296/146.12; 296/178; 49/109
[58] Field of Search ............................ 296/51, 57.1, 61, 296/62, 146.1, 146.4, 146.11, 146.12, 146.13, 178, 204; 49/104, 109–115

[56] References Cited

U.S. PATENT DOCUMENTS

| | | | |
|---|---|---|---|
| 577,960 | 3/1897 | Jacobs | 49/109 X |
| 2,070,722 | 2/1937 | Finke . | |
| 2,094,290 | 9/1937 | Brobson . | |
| 2,124,166 | 7/1938 | Mallett . | |
| 2,189,139 | 2/1940 | Fox | 296/178 X |
| 2,249,932 | 7/1941 | Beal | 49/109 |
| 2,541,288 | 2/1951 | Rice | 296/61 X |
| 2,606,786 | 8/1952 | Howard | 296/61 |
| 2,722,987 | 11/1955 | Dean et al. . | |
| 2,855,064 | 10/1958 | McCullough . | |
| 3,314,685 | 4/1967 | Bothwell . | |
| 3,637,252 | 1/1972 | Metsker . | |
| 3,861,739 | 1/1975 | Kinney | 296/146.11 |
| 3,874,527 | 4/1975 | Royce | 296/61 X |
| 3,941,261 | 3/1976 | Ricci . | |
| 4,049,312 | 9/1977 | Rudbeck | 296/178 |
| 4,127,300 | 11/1978 | Melley et al. . | |
| 4,155,468 | 5/1979 | Royce . | |
| 4,339,224 | 7/1982 | Lamb . | |
| 4,441,754 | 4/1984 | Hantel | 296/62 X |
| 4,453,684 | 6/1984 | Hanks . | |
| 4,535,867 | 8/1985 | Botar | 296/178 X |
| 4,847,972 | 7/1989 | Anderson et al. . | |
| 4,852,936 | 8/1989 | Greene et al. . | |
| 4,986,597 | 1/1991 | Clausen . | |
| 5,066,067 | 11/1991 | Ferdows . | |
| 5,085,485 | 2/1992 | Wurl . | |
| 5,131,714 | 7/1992 | Evans, Sr. et al. . | |
| 5,178,432 | 1/1993 | Zeman et al. . | |
| 5,259,081 | 11/1993 | Henderson | 296/61 X |

FOREIGN PATENT DOCUMENTS

| | | | |
|---|---|---|---|
| 87572 | 9/1983 | European Pat. Off. | 296/146.4 |
| 146522 | 7/1920 | United Kingdom | 296/178 |

*Primary Examiner*—Dean Kramer
*Attorney, Agent, or Firm*—Andrus, Sceales, Starke & Sawall

[57] ABSTRACT

A multipurpose vehicle includes a cab portion disposed over a front set of wheels and a rearwardly facing engine drivingly interconnected with a rear set of wheels. A frame is connected at its forward end to the cab portion, and the rear set of wheels and the engine are mounted to the frame. The frame includes a floor portion located between the rear set of wheels and the cab portion. The floor portion of the frame is defined by a pair of parallel side frame members extending in a front-to-rear direction, and an intermediate frame member located between the pair of side frame members. This construction allows the floor portion to be relatively low to the load. A segmented door assembly includes an upper door panel and a lower door member. The lower door member includes a pan member pivotably mounted to the frame, and a plate member pivotably mounted to the outer end of the pan member. The pan member and the plate member each define a tread surface which cooperate to form a ramp providing easy access into the interior of the vehicle when the door is opened.

7 Claims, 3 Drawing Sheets

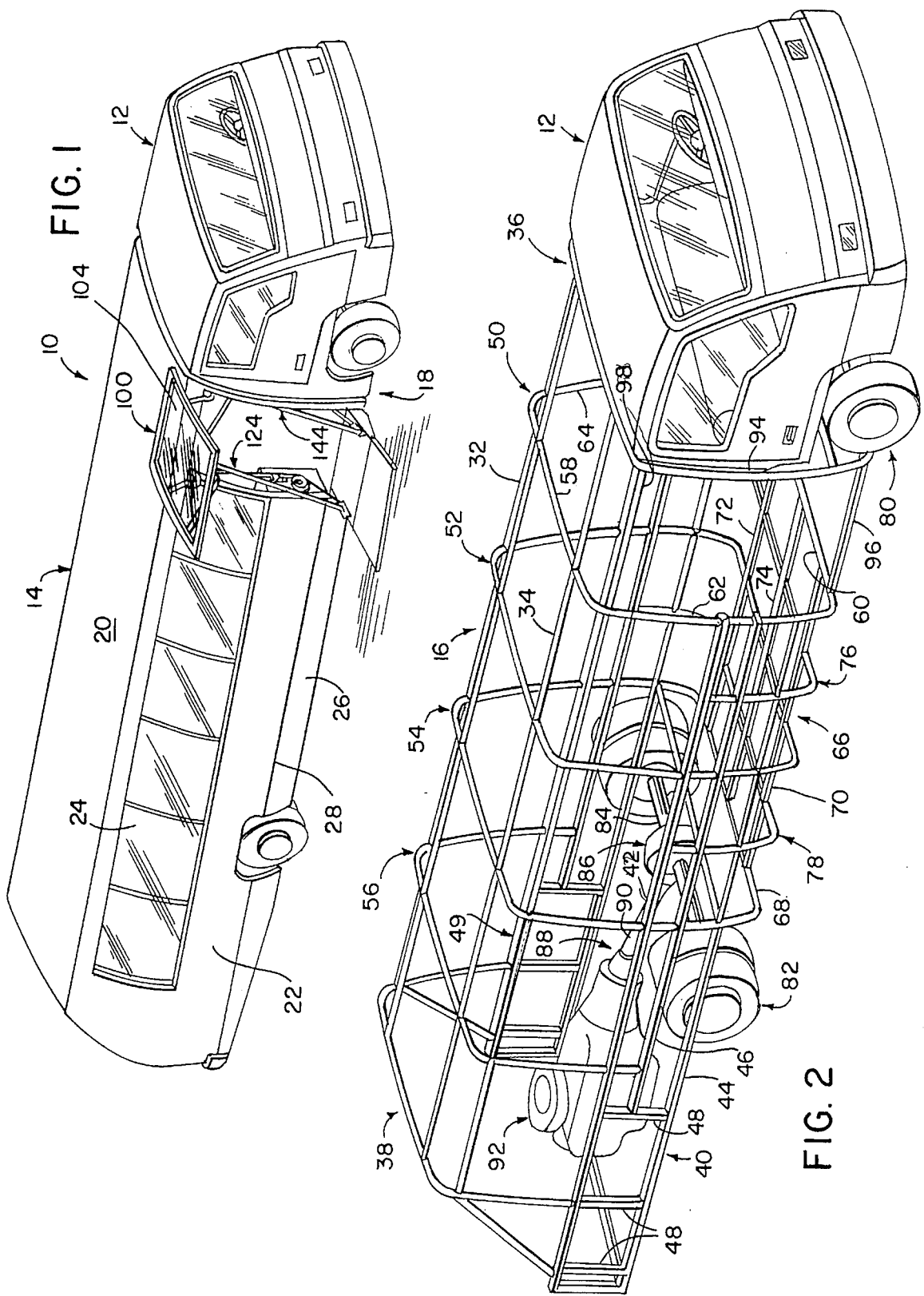

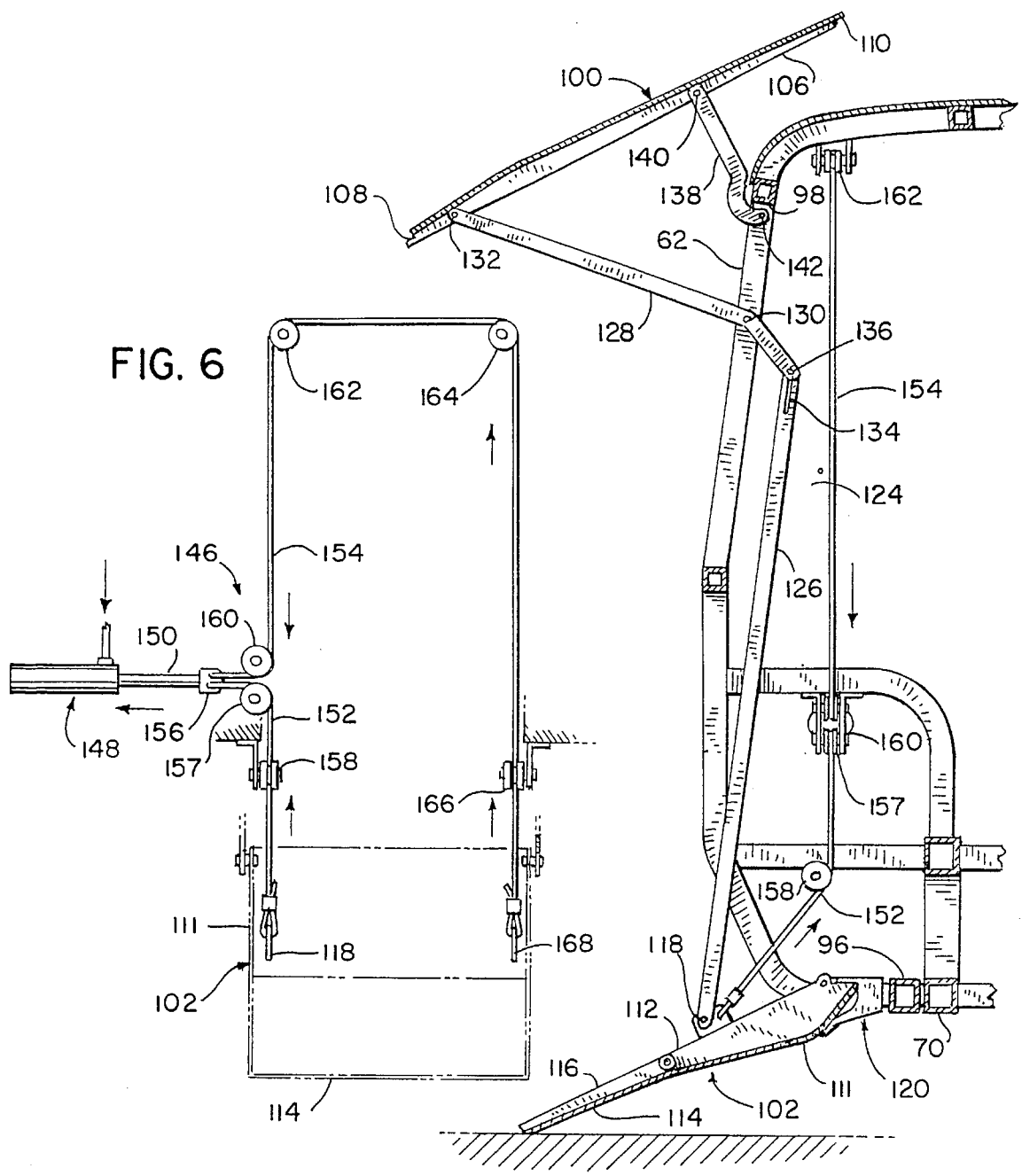

MULTIPURPOSE HIGHWAY VEHICLE

BACKGROUND AND SUMMARY

This invention relates to a vehicle, and more particularly to a multipurpose highway vehicle incorporating several features facilitating easy ingress and egress to and from the vehicle interior.

A conventional bus or van typically has several steps which must be climbed by passengers to reach the floor of the interior compartment of the bus or van. This presents a serious obstacle to disabled or handicapped persons, such as persons requiring a cane or walker or persons confined to a wheelchair. Steps are required due to the construction of the vehicle frame, which places the vehicle floor at a substantially higher elevation than the curb, sidewalk or street on which the passengers stand prior to entry into the vehicle.

It is an object of the present invention to provide a multipurpose vehicle which is easily accessed, providing advantageous use by disabled or handicapped persons. It is a further object of the invention to provide such a vehicle which utilizes a unique door construction to form a ramp facilitating ingress and egress to and from the interior of the vehicle. It is a further object of the invention to provide such a vehicle which is relatively simple in its components and construction, to facilitate ease of assembly and to provide a relatively low cost of manufacture.

In accordance with one aspect of the invention, a vehicle defines a front end and a rear end, and has a cab portion disposed over a set of front wheels and an engine located toward the rear of the vehicle and drivingly interconnected with a set of rear wheels. A frame structure is interconnected with the cab portion and with the engine and the rear set of wheels. The frame structure includes a lower substantially horizontal floor portion located forwardly of the rear set of wheels and rearwardly of the cab portion. The floor portion is formed of a pair of spaced substantially parallel side frame members extending in a front-to-rear direction located one on either side of the vehicle, and at least one intermediate frame member located between the side frame members and extending substantially parallel thereto. This construction of the vehicle frame departs significantly from conventional ladder-type floor frame construction, and enables the floor frame members to be relatively shallow while providing the necessary strength. Accordingly, the interior compartment floor can be at a significantly lower elevation than is possible with a prior art ladder-type frame, substantially reducing the difference in height between the floor and the curb, sidewalk or street from which the interior is accessed by passengers, while still providing adequate ground clearance for road hazards, breakover and/or contact interference with road surfaces and other such obstructions.

In accordance with another aspect of the invention, a multipurpose vehicle including a frame defining an interior is provided with a segmented door assembly including an upper door panel and a lower door member. The upper door panel is pivotably interconnected with the frame for movement between a raised open position and a closed position. The lower door member is also pivotably interconnected with the frame, for movement between a lowered open position and a closed position, and includes an inner door section pivotably interconnected with the frame and an outer door section pivotably interconnected with the inner door section. The upper door panel and the inner door section of the lower door member are each mounted to the frame for pivoting movement about a substantially horizontal pivot axis. A linkage is interconnected between the frame, the upper door panel and the lower door member, and an actuator moves one of the upper door panel and the lower door member between its open and closed positions, and the linkage functions to move the other of the upper door panel and the lower door member between its open and closed positions in response thereto. When the lower door member is moved to its open position, the outer end of its outer door section engages the sidewalk, curb or street, and the inner and outer door sections cooperate to define a ramp providing easy access from the curb, sidewalk or street to the interior compartment of the vehicle. The linkage functions to raise the upper door panel an amount sufficient to define a relatively high opening providing unobstructed entry for passengers into the interior of the vehicle.

In accordance with yet another aspect of the invention, a multipurpose vehicle is manufactured by first providing a vehicle chassis including a cab portion disposed over a set of front wheels, an engine, a rear set of wheels, and a transmission drivingly interposed between the engine and the rear set of wheels. Subsequently, the engine, the rear set of wheels and the transmission are removed from the chassis. A frame defining an interior and having a front end and a rear end is then interconnected with the cab portion of the chassis. The engine, transmission and rear set of wheels are then interconnected with the frame at a location spaced from the connection of the frame with the cab portion. A substantial portion of the frame interior is located between the rear set of wheels and the cab portion, and the engine and transmission extend rearwardly from the rear set of wheels toward the rear end of the frame. This method of manufacture involves a relatively small number of steps carried out subsequent to purchase of a conventional chassis, resulting in a relatively simple construction and low cost of manufacture.

In a particularly preferred form, the above-summarized features and method of manufacture are utilized together to result in a simple, efficient and relatively inexpensive vehicle providing significant advantages of operation in transporting handicapped or disabled persons.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a isometric view showing an assembled multipurpose vehicle constructed according to the invention;

FIG. 2 is a view similar to FIG. 1, showing the multipurpose vehicle with its exterior panels removed and illustrating the construction of the vehicle frame;

FIG. 5 is a view similar to FIG. 4, showing the upper door panel and the lower door member in their open positions; and FIG. 6 is a schematic view showing an actuator mechanism for moving the upper door panel and the lower door member of FIGS. 4 and 5 between their open and closed positions.

DETAILED DESCRIPTION OF THE INVENTION

Figure 3:
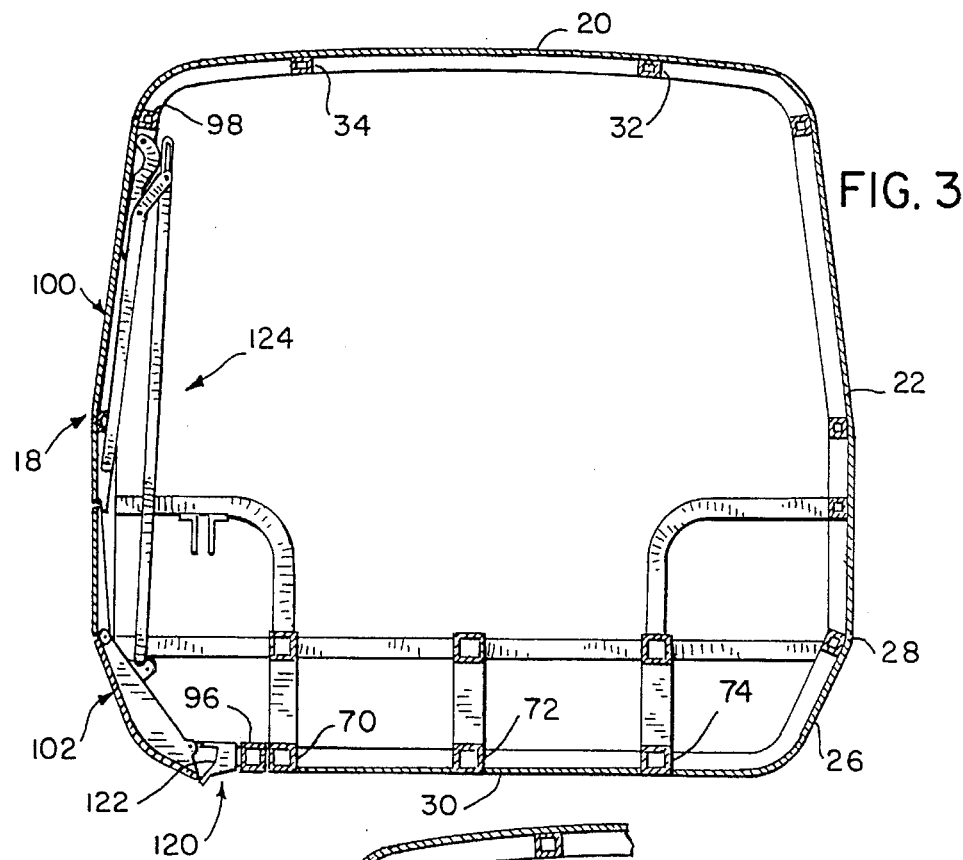
FIG. 3 is a transverse section view showing the components of the frame of the vehicle of FIGS. 1 and 2.

FIG. 1 illustrates a multipurpose vehicle 10 which generally includes a cab portion 12 and a body portion 14. Body portion 14 consists of a frame 16 (FIG. 2) defining an interior, with a door assembly 18 (FIG. 1) providing access to the interior of body portion 14.

Figure 4:
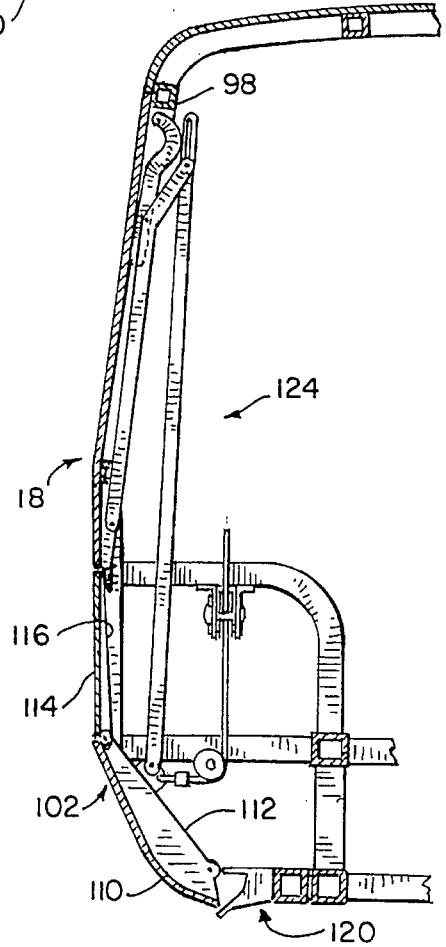
FIG. 4 is an enlarged partial section view showing the segmented door assembly of the vehicle of FIG. 1, with the upper door panel and the lower door member in their closed positions.

Body portion 14 consists of an upper wall 20 and a pair of side walls 22 extending downwardly from either side of upper wall 20. A line of windows 24 are provided in each side wall 22. A lower side wall 26 extends from the lower end of each side wall 22, being separated therefrom by a character line 28. Lower side walls 26 are curved, as illustrated in FIGS. 3 and 4, to deflect wind underneath vehicle 10 and to thereby increase the stability of vehicle 10. A bottom wall 30 (FIG. 3) extends between and interconnects the inner lower ends of lower side walls 26.

Referring to FIG. 2, frame 16 is constructed of a series of longitudinal frame members interconnected with a series of cages or ribs. Specifically, frame 16 includes a pair of upper longitudinal frame members 32, 34 extending rearwardly between the horizontal upper rib of a front cage 36 and the horizontal upper rib of a rear cage 38. On the door side of frame 16, the rear end of a frame subassembly 40 extends rearwardly of rear cage 38, and defines an upper frame member 42, a lower frame member 44 and an intermediate frame member 46. Vertical frame members 48 extend between upper and lower frame members 42, 44 toward the rear end of subassembly 40, and intermediate frame member 46 extends forwardly from the forwardmost of vertical frame members 48. Lower frame member 44 terminates at a location rearwardly of the forward ends of upper frame member 42 and intermediate frame member 46.

A frame subassembly 49 is provided on the opposite side of frame 16, and is constructed similarly to frame subassembly 40.

A series of full vertical frame cages 50, 52 and 54, constructed identically to front cage 36, are spaced at intervals rearwardly of front cage 36. A top half-cage 56 is located between full cage 54 and rear cage 38, being constructed substantially identically to rear cage 38.

Full cage 50, located immediately rearwardly of front cage 36, defines upper and lower ribs 58, 60 and spaced side ribs 62, 64 extending between upper and lower ribs 58, 60. Cages 52 and 54 are constructed substantially identically to cage 50.

The forward ends of upper frame member 42 and intermediate frame member 46 of frame subassembly 40 are interconnected with rib 62 of cage 50, terminating rearwardly of front cage 36 so as to define a side door opening in frame 16 within which door assembly 18 (FIG. 1) is mounted, in a manner to be explained. Frame subassembly 49 differs from frame subassembly 40 in that its top and intermediate frame members, analogous to members 42, 46, extend forwardly of cage 50 and are interconnected with the side rib of front cage 36.

Frame 16 defines a floor portion, shown generally at 66, located between lower rib 60 of cage 50 and a lower rib 68 associated with cage 54. Floor portion 66 consists of a pair of side floor frame members 70, 72 which extend in a front-to-rear direction between lower ribs 60, 68 of cages 50, 54, respectively. A central floor frame member 74 extends parallel to frame members 70, 72 between lower ribs 60, 68, located midway between side floor frame members 70, 72.

A pair of lower half-cages 76, 78 are located midway between full cages 50, 52 and 52, 54, respectively. Each of half-cages 76, 78 includes a pair of side ribs extending downwardly from the side frame members, such as 42, and lower horizontal ribs extending between floor frame members 70, 72 and 74.

Floor frame members 70–74 enable floor portion 66 to be relatively low in elevation. In the past, the floor of a bus-type vehicle has been constructed of a ladder-type frame providing a pair of side members located one on each side of the vehicle, with cross-members extending therebetween. Necessarily, the side members were constructed of relatively large section structural members in order to provide sufficient strength to support the floor thereabove. Providing a central frame member, such as 74, in floor portion 66 allows each of frame members 70–74 to be constructed of a relatively shallow section structural member. With this arrangement, when the floor is mounted over floor members 70–74 and the cross-members extending therebetween, the floor is at a relatively low elevation, thereby reducing the vertical distance which must be traveled by a passenger entering the interior of vehicle 10.

As shown in FIG. 2, cab portion 12 of vehicle 10 includes a front set of steerable wheels, one of which is shown at 80, mounted below cab portion 12. Vehicle 10 further includes a rear set of non-steerable wheels, such as shown at 82. Rear wheels 82 are mounted to the ends of an axle 84, which is interconnected through a differential 86 with a transmission 88 having a drive shaft 90. A conventional internal combustion engine 92 supplies power to transmission 88 and drive shaft 90 for turning wheels 82 in response to operation of engine 92. Engine 92 is located between the rear portions of side frame subassemblies 40, 49, and is supported by conventional engine mounts (not shown). With this arrangement, engine 92 is easily accessed from the rear by means of a movable panel (not shown) mounted to frame 16, and from underneath frame 16.

Vehicle 10 is constructed by purchasing a conventional forward control tilt-cab front engine/rear drive commercial vehicle chassis, regardless of weight classification, such as is available from manufacturers such as Hino. Such a chassis is fully tested and certified for use on public highways, meeting the requirements of the EPA, USDOT and NHTSA, and includes the manufacturer's statement of origin and title. Engine 92, transmission 88, axle 84 and wheels 82 are then removed from the chassis, and frame 16 is mounted to cab portion 12 of the chassis as illustrated in FIG. 2. Thereafter, engine 92, transmission 88, axle 84 and wheels 82 are mounted to frame 16 as shown, such that axle 84 and wheels 82 are located rearwardly of floor portion 66. With this method of manufacture, a front-engine rear-drive chassis is purchased and converted into a rear-engine rear-drive bus-type vehicle, with only minor modifications to the components of the chassis after purchase, in compliance with the manufacturer's "body builders book". All components are "cannibalized" and reused, maintaining weight, gross vehicle weight, center of gravity and wheel base requirements as outlined in said manufacturer's "body builders book". By meeting such guidelines, all testing required by government statutes is maintained in the new configuration, i.e. forward control fixed cab rear engine/rear drive vehicle utilizing a low floor chassis configuration.

The relationship of key components to each other, such as front axle/front suspension and cab, remain essentially unchanged in the new configuration, thereby maintaining the integrity of the vehicle manufacturer's original design. By reassembling the vehicle as described, all documentation, i.e. manufacturer's statement of origin (MSO) title, serial number and model designation remain intact. Thus, the vehicle can be sold as a complete vehicle utilizing manufacturer's corporate name, serial number, MSO, title and model number designation, thereby simplifying the end user's need for parts location and procurement for periodic maintenance or repair due to damage or other need for component replacement. Furthermore, all publications printed by or otherwise issued by the original vehicle manufacturer remain valid and appropriate for necessary repair and/or replacement of any vehicle subsystems or components. It will be necessary, however, to supply a supplemental technical or service manual to identify modifications to service procedures and vehicle manufacturer's original repair manual necessitated by the relocation of certain key components or subsystems, e.g. the engine now being located behind the rear axle and not beneath the forward control tilt cab as vehicle was originally configured.

The result is a rear engine/rear drive forward control multi-purpose, passenger-carrying highway vehicle with a fixed cab utilizing a unitized chassis constructed of welded steel tubing, whereas the vehicle was originally configured as a "body on chassis" design with a movable tilt cab. In the reconfiguration of the vehicle, the tilt cab is no longer an independent component that is independent of any body work behind said tilt cab.

The construction of vehicle 10 as outlined above further serves to remove the drive train between engine 92 and the drive wheels, in this case rear wheels 82, from below the vehicle floor in order to prevent the drive train from obstructing the vehicle floor and/or necessitating the floor being raised to accommodate the drive train. All of this serves to maintain the floor of vehicle 10 at a relatively low elevation. Illustratively, the floor of vehicle 10 may be as low as approximately 11 inches above the road on which vehicle 10 operates.

After frame 16 has been mounted to cab portion 12 and wheels 82, axle 84, differential 86, transmission 88 and engine 92 are installed as shown in FIG. 2, panels are mounted to the members of frame 16 to form walls 20–30 of body portion 14. Preferably, panels constructed of a lightweight polycarbonate material such as Lexan are secured to the frame members, such as by adhesive mounting or any other satisfactory means. The body panels are easily removed from frame 16 for replacement or repair. Further, whenever possible, modular body panels are provided for minimizing the number of different designs required.

FIGS. 3–6 illustrate in detail the construction of door assembly 18, which is located within the door opening defined by side rib 62 of frame cage 50, a side rib 94 of front frame cage 36, a lower axial frame member 96 and an upper axial frame member 98. Axial frame members 96, 98 extend between the lower and upper ribs, respectively, associated with frame cages 36 and 50, respectively.

Referring to FIGS. 3–5, door assembly 18 consists of an upper door panel 100 and a lower door member 102. As best seen in FIG. 1, upper door panel 100 may include a window 104, for providing visual access to the interior of vehicle 10. Upper door panel 100 includes a peripheral frame structure, defined by a pair of side frame members such as 106 located one on either side of window 104. Upper door panel 100 further defines a lip 108 at its lower end, and a lip 110 at its upper end.

Lower door member 102 consists of an inner pan 111 hinged at its ends to the lower ends of side ribs 62, 94. Pan 111 further defines a tread surface 112. Lower door member 102 further includes an outer plate 114 hinged to the end of pan 111. Plate 114 includes a tread surface 116. A pair of ears, one of which is shown at 118, are mounted to pan 111, extending upwardly from tread surface 112 on either side of pan 111.

A threshold member 120 extends between cages 36, 50 adjacent axial frame member 96. Threshold member 120 includes a recess 122 which receives the end of pan 111 when pan 111 is pivoted to its open position, as shown in FIG. 5. Threshold member 120 includes an upper horizontal surface which bridges the gap between tread surface 112 of pan 111 and axial floor member 96.

A linkage assembly 124 is interconnected between upper door panel 100 and lower door member 102. Linkage assembly 124 includes a lower link member 126 which is hinged at its lower end to ear 118, and an upper link 128 pivotably mounted to side rib 62 via a pin 130 and to upper panel frame member 106 via a pin 132. Lower link 126 includes a slot 134 at its upper end, and the end of upper link 128 includes a pin 136 which is received within slot 134 to interconnect lower link 126 with upper link 128.

A hinge link 138 is interconnected with upper panel frame member 106 via a pin 140, and with side rib 62 via a pin 142.

As illustrated in FIG. 1, a linkage assembly 144, constructed identically to linkage assembly 124, is located opposite linkage assembly 124 for interconnecting the opposite sides of upper door panel 100 and lower door member 102 with the side rib of front frame cage 36.

In a manner to be explained, an actuator system 146 (FIG. 6) is interconnected with door assembly 18 for selectively opening and closing door assembly 18. Actuator system 146 includes a linear actuator assembly 148 having an extendable and retractable rod 150, and a pair of cables 152, 154 are connected via a carrier 156 to the end of rod 150. Cable 152 is trained about a pair of pulleys 157, 158 and is connected at its end to ear 118. Cable 154 is trained about a series of pulleys 160, 162, 164 and 166, and is connected at its end to ear 168 mounted opposite ear 118 on pan 111. With this arrangement, cables 152, 154 do not interfere with ingress and egress to and from the interior of vehicle 10.

Door assembly 18 is maintained in its closed position as shown in FIG. 4 by retraction of rod 150 into linear actuator assembly 148, in a conventional manner. When door assembly 18 is closed, lower door member 102 is maintained in its FIG. 4 position, with the outer end of plate 114 engaging lip 108 in the lower end of upper door panel 100. Lip 110 in the upper end of upper door panel 100 is engaged with door frame member 98. To move door assembly 18 to its open position as shown in FIG. 5, linear actuator assembly 148 is operated to extend rod 150. Under the influence of gravity, pan 111 of lower door member 102 is pivoted in a counterclockwise direction to assume its lowered open position as shown in FIG. 5. The outer end of plate 114 engages the ground, street or sidewalk surface, such that tread 116 of plate 114 and tread 112 of pan 111 define a ramp extending between the floor of vehicle 10 and the ground, street or sidewalk.

Upon pivoting counterclockwise movement of lower door member 102, linkage assemblies 124, 144 function to move upper door panel 100 to its raised open position as shown in FIG. 5. The configuration of lower and upper links 126, 128, respectively and hinge link 138 provide swinging upwardly clockwise movement of door panel 100 from its closed position of FIG. 4 to its open position of FIG. 5. This arrangement provides a small envelope of movement of upper door panel 100 and lower door member 102, to maintain such movement relatively close to vehicle 10. When door assembly 18 is in its open position, the passengers enter or exit vehicle 10 using the ramp defined by tread surfaces 112, 116. With disabled or handicapped passengers, tread surfaces 112, 116 provide a gradual transition from the supporting surface to the floor of vehicle 10. Thereafter, door assembly 18 is subsequently moved back to its closed position of FIG. 4 by retracting rod 150 of linear actuator assembly 148.

Various alternatives and embodiments are contemplated as being within the scope of the following claims particularly pointing out and distinctly claiming the subject matter regarded as the invention.

I claim:

1. A segmented door assembly for enclosing a door opening in a multipurpose vehicle including a frame defining an interior, comprising:

an upper door panel pivotably interconnected with the frame for movement between an open position and a closed position;

a lower door member pivotably interconnected with the frame for movement between an open position and a closed position, and including an upper tread surface defining a ramp leading into the interior of the vehicle when the lower door member is in its open position and an outer end which engages the ground when the lower door member is in its open position, wherein the lower door member includes a first, inner portion connected to the vehicle and a second, outer portion hingedly connected to the first, inner portion, wherein the second, outer portion defines the outer end of the lower door member; and wherein, when in their closed positions, the upper door panel is located within an upper portion of the door opening and the lower door member is located within a lower portion of the door opening and the upper door panel and the lower door member together cooperate to enclose the door opening, wherein the upper door panel and the lower door member define lower and upper edges, respectively, which are engageable with each other when the upper door panel and the lower door member are in their closed positions;

a linkage interconnected between the frame and the upper door panel and the lower door member;

an actuator for moving one of the upper door panel and the lower door member between its open and closed positions, wherein the linkage functions to move the other of the upper door panel and the lower door member between its open and closed positions in response thereto, wherein the actuator comprises an extendible and retractable member interconnected with the vehicle for selective movement between an extended position and a retracted position, and a cable interconnected between the extendible and retractable member and the lower door member for moving the lower door member between its open and closed positions, wherein the linkage functions to move the upper door panel between its open and closed positions in response to movement of the lower door member between its open and closed positions.

2. The door assembly of claim 1, wherein the cable is connected toward one side of the first, inner portion of the lower door member, and further comprising a second cable trained about a series of pulleys and interconnected with the opposite side of the first, inner portion of the lower door member.

3. A segmented door assembly for enclosing a door opening in a multi-purpose vehicle including a frame defining an interior, comprising:

an upper door panel pivotably interconnected with the frame for movement between an open position and a closed position, wherein the upper door panel is pivotably interconnected with the frame by means of a hinge link defining an inner end and an outer end, wherein the hinge link is pivotably interconnected with the frame toward its inner end and is pivotably interconnected with the upper door panel toward its outer end;

a lower door member pivotably interconnected with the frame for movement between an open position and a closed position, and including an upper tread surface defining a ramp leading into the interior of the vehicle when the lower door member is in its open position and an outer end which engages the ground when the lower door member is in its open position;

wherein, when in their closed positions, the upper door panel is located within an upper portion of the door opening and the lower door member is located within a lower portion of the door opening and the upper door panel and the lower door member together cooperate to enclose the door opening;

a linkage interconnected between the frame and the upper door panel and the lower door member, wherein the linkage comprises an upper link member defining an inner end and an outer end, wherein the upper link member is pivotably mounted to the upper door panel toward its outer end, a lower link member defining an upper end and a lower end, wherein the lower link member is pivotably mounted to the upper link member toward the upper end of the lower link member and toward the inner end of the upper link member, wherein the lower end of the lower link member is pivotably secured to the lower door member, and wherein the upper link member is pivotably secured to the frame at a location intermediate its inner and outer ends; and an actuator for moving one of the upper door panel and the lower door member between its open and closed positions, wherein the linkage functions to move the other of the upper door panel and the lower door member between its open and closed positions in response thereto.

4. The door assembly of claim 3, wherein the actuator moves the lower door member between its open and closed positions, and wherein the linkage functions to move the upper door panel between its open and closed positions in response thereto.

5. In a multipurpose vehicle defining front and rear ends and having a cab portion disposed over a set of front wheels and an engine located toward the rear of the vehicle and drivingly interconnected with a set of rear wheels, the improvement comprising a frame structure interconnected with the cab portion and with the engine and the rear set of wheels, the frame structure including: a lower substantially horizontal floor subassembly located forwardly of the rear set of wheels and rearwardly of the cab portion, the floor subassembly comprising a pair of spaced substantially parallel side frame members extending in a front-to-rear direction located one on either side of the vehicle, at least a first intermediate frame member located between the side frame members and extending substantially parallel to the side frame members, and a series of transverse cross-members extending between and interconnecting the side frame members and the intermediate frame member; a series of frame cages defining spaced, lower sides, wherein each frame cage lower side is interconnected with one of the side frame members of the floor subassembly; and a pair of side rail subassemblies interconnected with the floor subassembly via one or more of the frame cages.

6. The improvement of claim 5, further comprising one or more partial frame cages extending between the side frame subassemblies and the floor subassembly.

7. The improvement of claim 5, wherein the frame structure defines a door opening adjacent the cab, and wherein the frame subassembly extends rearwardly from the door opening.

* * * * *

UNITED STATES PATENT AND TRADEMARK OFFICE
CERTIFICATE OF CORRECTION

PATENT NO.   :   5,577,793

DATED        :   November 26, 1996

INVENTOR(S)  :   RICHARD A. KOBASIC

It is certified that error appears in the above-identified patent and that said Letters Patent is hereby corrected as shown below:

Claim 1, column 7, line 31, after "portion" insert -- hingedly --.

Signed and Sealed this

Twenty-fifth Day of February, 1997

Attest:

BRUCE LEHMAN

*Attesting Officer*   *Commissioner of Patents and Trademarks*